United States Patent
Wu et al.

(10) Patent No.: US 7,434,941 B2
(45) Date of Patent: Oct. 14, 2008

(54) SYSTEM AND METHOD FOR ARC LAMP POWER CONTROL

(75) Inventors: Kuohua Wu, Tucson, AZ (US); Kevin Hulick, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/443,404

(22) Filed: May 30, 2006

(65) Prior Publication Data

US 2007/0278963 A1  Dec. 6, 2007

(51) Int. Cl.
*G03B 21/20* (2006.01)
*G03B 21/14* (2006.01)
*H05B 37/00* (2006.01)
*H05B 37/02* (2006.01)

(52) U.S. Cl. .......................... 353/85; 353/82; 315/307; 315/291

(58) Field of Classification Search ................. 315/291, 315/307, 224, 244, 243; 313/231.41, 231.51, 313/231.71; 353/79, 82, 85
See application file for complete search history.

(56) References Cited

U.S. PATENT DOCUMENTS

| | | | |
|---|---|---|---|
| 2,171,027 A | 8/1939 | Gelb | |
| 3,297,904 A | 1/1967 | Lauxen | |
| 3,775,617 A | 11/1973 | Dubauskas | |
| 3,825,713 A | 7/1974 | Bell, Jr. | |
| 3,927,293 A | 12/1975 | Bell, Jr. | |
| 3,987,271 A | 10/1976 | Bell, Jr. et al. | |
| 4,142,127 A | 2/1979 | Suga | |
| 4,942,046 A | 7/1990 | Scott | |
| 5,856,665 A | 1/1999 | Price et al. | |
| 5,932,976 A * | 8/1999 | Maheshwari et al. | 315/291 |
| 6,215,252 B1 | 4/2001 | Stanton | |
| 6,798,153 B2 * | 9/2004 | Mattas et al. | 315/307 |
| 6,809,809 B2 * | 10/2004 | Kinney et al. | 356/237.5 |
| 6,864,685 B2 * | 3/2005 | Otsuka et al. | 324/410 |
| 6,906,467 B2 | 6/2005 | Stam et al. | |
| 6,943,498 B2 * | 9/2005 | Nishiura et al. | 313/568 |
| 6,522,086 B2 * | 7/2007 | Nakagawa et al. | 345/101 |
| 2006/0273744 A1 * | 12/2006 | Callewaert et al. | 315/308 |
| 2007/0159445 A1 * | 7/2007 | Nakagawa et al. | 345/101 |

FOREIGN PATENT DOCUMENTS

JP  58-90202  12/1984

* cited by examiner

*Primary Examiner*—David Hung Vu
*Assistant Examiner*—Minh Dieu A

(57) ABSTRACT

An arc lamp system includes an arc lamp, having a life span, a power supply, and a power control servo. The power supply is electrically coupled to the arc lamp and configured to provide power thereto, and the power control servo is coupled to the power supply, and configured to cause the power supply to provide lower power to the arc lamp at a beginning of the life span, and to provide greater power to the arc lamp toward an end of the life span.

20 Claims, 3 Drawing Sheets

SYSTEM AND METHOD FOR ARC LAMP POWER CONTROL

BACKGROUND

Digital projection systems have become substantially more popular, more powerful and less expensive in recent years. Digital projection systems generally include a spatial light modulator for producing an image, and a light source to illuminate the light modulator and associated optical elements to project the image onto a projection surface. There are a variety of types of digital projection systems that have been developed and gained widespread use in recent years. These include liquid crystal display (LCD) systems (both reflective and transmissive), liquid crystal on silicon (LCOS) displays, and digital mirror devices (DMD), among others.

To provide adequate projection illumination, digital projection systems often employ an arc lamp as the light source. Arc lamps generally include a pair of electrodes having a gap between them. A high voltage electric arc is caused to jump across this gap, and in so doing produces the desired light. One type of arc lamp that is frequently used is a Xenon arc lamp. Xenon arc lamps allow "instant-on" functionality (unlike ultra-high pressure (UHP) lamps that have a slower turn-on time) and provide a good color gamut because the xenon emission spectrum is relatively high and flat in the visible range. Xenon lamps are also more environmentally friendly because, unlike UHP lamps, they do not contain mercury.

In systems employing an arc lamp, including projection systems and other devices, the lifetime and brightness of the lamp is a significant factor for convenience, economy, and user satisfaction. If the lamp has a short lifetime, the user will be required to replace it often, which is both inconvenient and expensive. Additionally, if the brightness of the lamp diminishes too much during its lifetime or fluctuates noticeably over relatively short time periods, this can greatly diminish the satisfaction of the user.

There are a number of factors that can contribute to a decrease in the output of an arc lamp over time. One of these factors is variation in the gap between electrodes in the lamp. Variation in the electrode gap in an arc lamp has a great effect on the quality and brightness of the lamp. When the electrode gap is comparatively small, the fireball or plasma ball produced between the electrodes is likewise small and relatively compact. However, when the gap is larger, the plasma ball will tend to be more stretched out and diffuse. This phenomenon is of particular interest because the light of the arc is usually reflected by an elliptical or otherwise curved reflector. When the arc fireball is larger, the image of it that is reflected by the reflector will be larger, and thus less light will be coupled into the subsequent optical systems. In projection systems, the integrator tunnel/homogenizer that receives the light from the lamp is typically of industry standard dimensions. For maximum light coupling (and thus maximum light projection efficiency), it is desirable for the plasma to be as compact as possible, and as close as possible to the focal point of the reflector.

There are several factors that tend to change the electrode gap in arc lamps. One of these is long-term electrode burn back. As an arc lamp is used over its lifetime, the electrode tips will tend to burn and ablate away, thus reducing the length of the electrodes and thereby increasing the electrode gap. The long-term widening of the electrode gap due to electrode burn back produces an ever-larger fireball, causing the brightness of the lamp to gradually diminish over the lifetime of the lamp as described above.

Another factor that affects the electrode gap is short-term thermal expansion. As a lamp heats up from the time the arc is initially struck until it reaches a state of thermal equilibrium, the size of the electrode gap and the center of its position can vary due to the coefficients of thermal expansion of the anode cathode, reflector, and other lamp components. Since the various components of the lamp are made of different materials having differing coefficients of thermal expansion, the electrode gap when the device is not in use and at room temperature will normally vary from the electrode gap when the device is operating and at thermal equilibrium. Differential thermal expansion of the lamp and light engine parts can cause the fireball image and other parts of the device to move relative to each other, thus reducing coupled light.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein.

DETAILED DESCRIPTION

Figure 1:
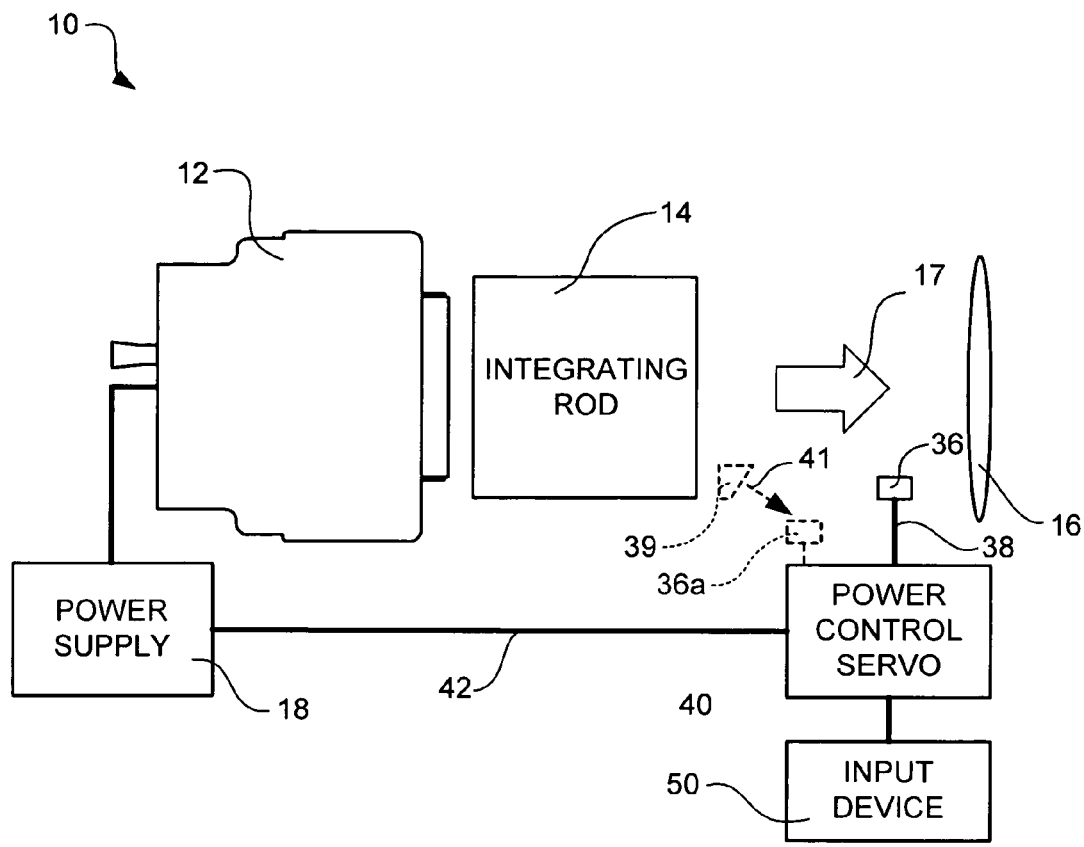
FIG. 1 is a block diagram of one embodiment of an arc lamp device having an automatic power control servo system.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

Shown in FIG. 1 is a portion of a projection system 10 including an arc lamp light source. The system includes an arc lamp 12, an integrating rod 14 (or other light homogenizing/coupling device) for internally reflecting the light in order to get uniform light intensity across the cross-section of the light beam, optics 16 for focusing and directing the light 17 upon a spatial light modulator (not shown), and a power supply 18 for providing electrical power to the arc lamp. The shape of the integrating rod as depicted in the figure does not necessarily represent the actual shape or proportions of an actual integrating rod, but is representative only. It will be apparent that a projection system is only one type of device employing an arc lamp light source, and that the system and method disclosed herein can apply to many systems that use arc lamps for illumination.

Figure 2:
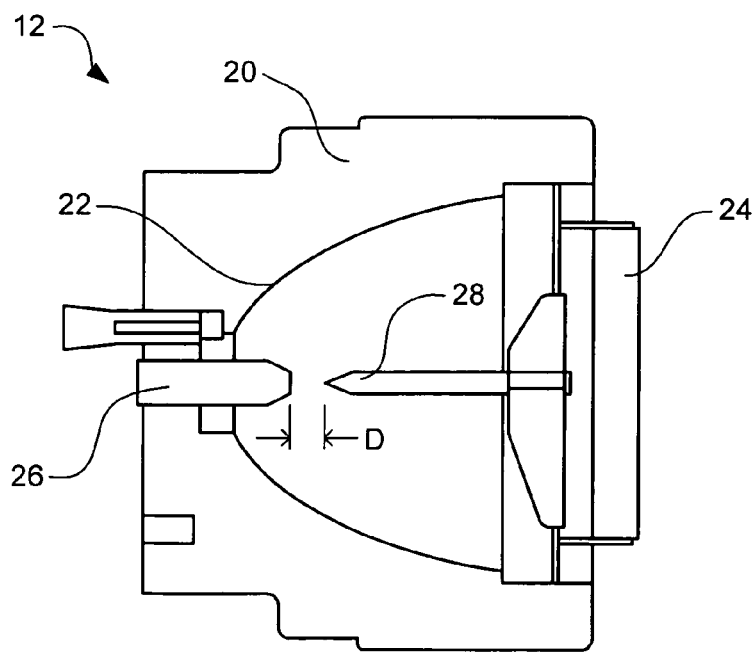
FIG. 2 is a cross-sectional view of an arc lamp.

A closer cross-sectional view of the arc lamp 12 is provided in FIG. 2. The lamp generally includes a lamp body 20, which includes a curved (e.g. elliptical) reflector 22, a lens 24, and the arc lamp electrodes, including an anode 26 and cathode 28. Between the anode and cathode is a gap having a length D.

The electrical arc jumps across this gap, which is intended to be centered at the geometric focal point of the reflector, so that as much as possible of the light produced by the arc will be reflected through the lens for use.

As noted above, the physical size of the electrode gap D is a significant factor in the quality and brightness of the lamp. Unfortunately, both short-term and long-term changes in this electrode gap can have negative effects on the lamp performance. As a general rule, the output intensity of an arc lamp gradually deteriorates over time. This long-term drop in output intensity is largely due to burn back of the electrodes of the arc lamp, which causes the gap D between the electrodes to gradually widen over time. The output power of an arc lamp generally decreases with use, largely due to the erosion of the electrodes (primarily the cathode), which increases the gap between the cathode and anode. The wider gap between the electrodes creates a larger fireball or plasma, which decreases the brightness of the lamp because the larger fireball causes the lamp etendue to decrease (because the integrator tunnel has a fixed cross section). As noted above, a wider electrode gap creates a larger plasma ball, which will tend to provide less light to the collection optics for the projector or other device.

Another factor that contributes to long-term degradation of lamp performance is the deposition of material onto the reflector 22 and lens 24. Over time, material from the lamp electrodes, especially the cathode, and possibly other parts of the lamp, burns off and becomes deposited on the reflector and lens. This gradually reduces the reflectivity of the reflector and the transmissivity of the lens, which results in lower lamp output for a given power consumption.

Figure 3:
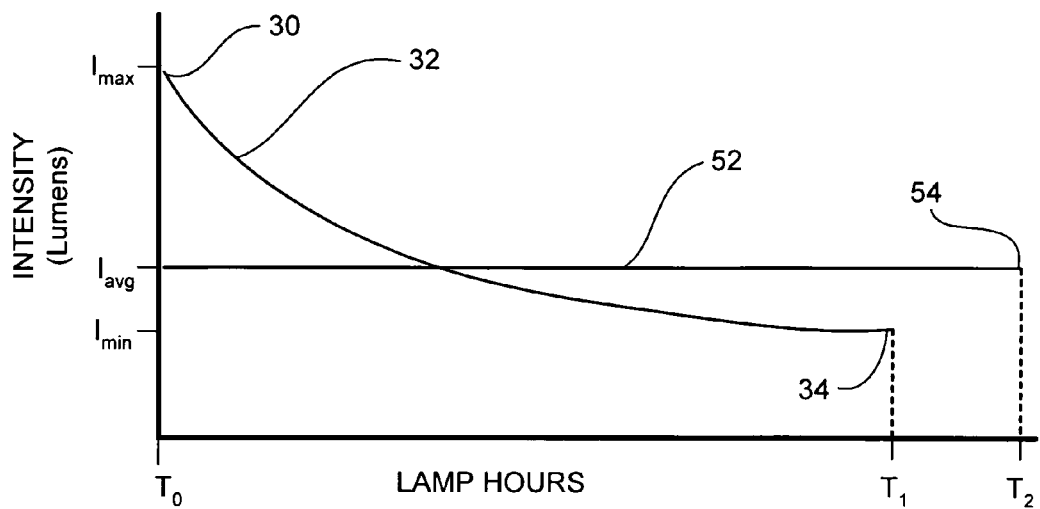
FIG. 3 is a graph of light output over time for an arc lamp.

Long-term lamp intensity deterioration is depicted in FIG. 3. When a lamp is new, at time $T_0$, it will initially provide a peak output intensity $I_{max}$, this condition being represented by the beginning point 30 of curve 32. However, as the lamp is used, it will gradually produce less and less light, even when provided with constant power (as is the presumption in the graph of FIG. 3), as indicated by the downwardly sloping intensity curve 32. Eventually, at time $T_1$, which represents the termination of the lamp's life in the typical situation, the lamp will generally be producing its lowest output $I_{min}$, this condition being represented by the end point 34 of the intensity curve 32.

Additionally, as a lamp warms up from room temperature to its operating temperature, thermal expansion will also cause the electrode gap D to vary. This short-term variation of the electrode gap also affects the quality and brightness of the lamp output in the same way long term gap widening does.

Because of the long-term variation in spacing of arc lamp electrodes, systems including arc lamps are frequently configured to provide much more light intensity than is actually needed when the lamp is new (as seen at the left end of curve 32 in FIG. 3), with the expectation that the lamp intensity will deteriorate over time (as shown toward the right end of line 32 in FIG. 3). Designers of arc lamp systems frequently design the system based upon a desired average output intensity ($I_{avg}$ in FIG. 3) for the lamp over its life. The result of this approach is that the lamp provides far more light than needed ($I_{max}$, in FIG. 3) when new, and less light than desired ($I_{min}$, in FIG. 3) toward the end of their life, and only actually provide the desired average output ($I_{avg}$, in FIG. 3) at one time during the life of the lamp.

Disclosed herein is a system and method for automatic control of the power to an arc lamp. The system and method can provide more constant light output intensity from the lamp and/or lengthen the lamp life. This system and method can provide more constant long-term light intensity (i.e. over the life of the lamp), and also more consistent short-term intensity (i.e. during a single lamp use session). The system provides an automatic power control servo (APCS) that automatically adjusts the power provided to the lamp, thereby providing more consistent brightness throughout a lamp's lifetime, and throughout a single use session. According to one embodiment, the APCS can drive less power to the lamp at low lamp hours (i.e. when the lamp is new), and more power to the lamp as the lamp ages and its brightness begins to decline due to changes in the electrode gap, deposition on the reflector and lens, and other lamp degradation factors. The APCS can also adjust the power provided to the lamp upon start-up in order to compensate for short-term lamp intensity variations due to thermal expansion of the lamp. The system and method can adjust the lamp power up or down by large or small amounts as needed, either over a short or long time frame, in order to maximize the life of the lamp, and to make lamp output intensity more consistent if desired. Since a user is unlikely to notice small changes in lamp intensity, the system can increase lamp life without presenting a noticeable change in system performance.

As noted above, one advantage of the present system and method is that it can lengthen the useful life of a lamp. The standard measure for arc lamp life expectancy is based on the number of hours for the lamp light output (intensity) to decrease by one-half. With the present system and method, the initial lamp output intensity will be less than otherwise, while lamp output toward the end of its life will increase relative to the output normally expected from a lamp operated under constant power throughout its life. This causes the initial output of the lamp to be lower, but increases the lamp's ability to maintain this light output. The combination of these factors provides a lamp with a greater lifetime, though with a lower overall lumen rating.

The graph of FIG. 3 demonstrates how the lamp life can be extended even without any increase in the total lamp output over its life. The normal mode of using arc lamp devices is to provide substantially constant power to the lamp, and accept gradually deteriorating performance over the lamp's lifetime. Conversely, the approach of the present system and method is almost the opposite. This method seeks to obtain substantially constant lamp output over the lifetime of the lamp by changing the power provided to the lamp.

As can be seen in FIG. 3, by reducing the initial output level of the lamp from $I_{max}$ to $I_{avg}$ (by initially reducing the power to the lamp), the normal rate of deterioration of the lamp will slow, and the useful life of the lamp can thereby increase from a total of $T_1$ hours, corresponding to the terminal end 34 of the typical lamp intensity curve 32, to a total of $T_2$ hours, corresponding to the terminal end 54 of the substantially flat average intensity curve 52. In the latter part of the life of the lamp, power to the lamp will be increased, allowing the lamp to maintain the substantially constant output, despite its deterioration. Consequently, in the early part of the life of the lamp its brightness and power consumption will be less than otherwise, while in the later part of the life of the lamp the brightness and power consumption will be greater than otherwise.

Total lamp output over its life can be quantified as the area under the lamp life intensity curve, being represented in units of intensity (e.g. lumens) times units of time (e.g. hours). As can be seen in FIG. 3, because of its gradually declining curve, the area under the lamp life intensity curve 32 from $T_0$ to $T_1$ is approximately the same as the area under the average intensity curve 52 from $T_0$ to $T_2$. Thus the lamp will last longer simply by managing its power better. Given the expense of high output arc lamps, this can provide significant savings to a user.

One embodiment of a system for automatic arc lamp power control is shown in FIG. 1. In addition to the arc lamp 12 and power supply 18, this system includes a photodetector 36 that is electrically connected via line 38 to a power control servo 40. The power control servo in turn is electrically connected via line 42 to the lamp power supply 18. The photodetector can be a photodiode or other suitable device for providing a signal indicating the intensity of incident light, and can be a wide band or narrow band device.

It will be apparent that the appropriate location for the photodetector 36 can vary depending upon the configuration of the particular device involved. In general, the photodetector should be located in the path of light from the arc lamp, so as to receive an accurate indication of lamp intensity, but without obstructing the light that is to be used. In the projection system embodiment of FIG. 1 the photodetector is disposed adjacent to the outlet end of the integrating rod 14, but toward the side. This is done so that the photodetector will not obstruct the light needed for illuminating an image produced by the projector, yet will still receive a true indication of the overall lamp intensity. Alternatively, a small beam splitter 39 can be placed in the light path to diffract a small beam of light 41 to a photodetector 36a located out of the main light stream. As noted above, the integrating rod internally reflects and scatters the light so that the light output at the discharge end of the integrating rod is substantially uniform in intensity across the cross-section of the rod.

Figure 5:
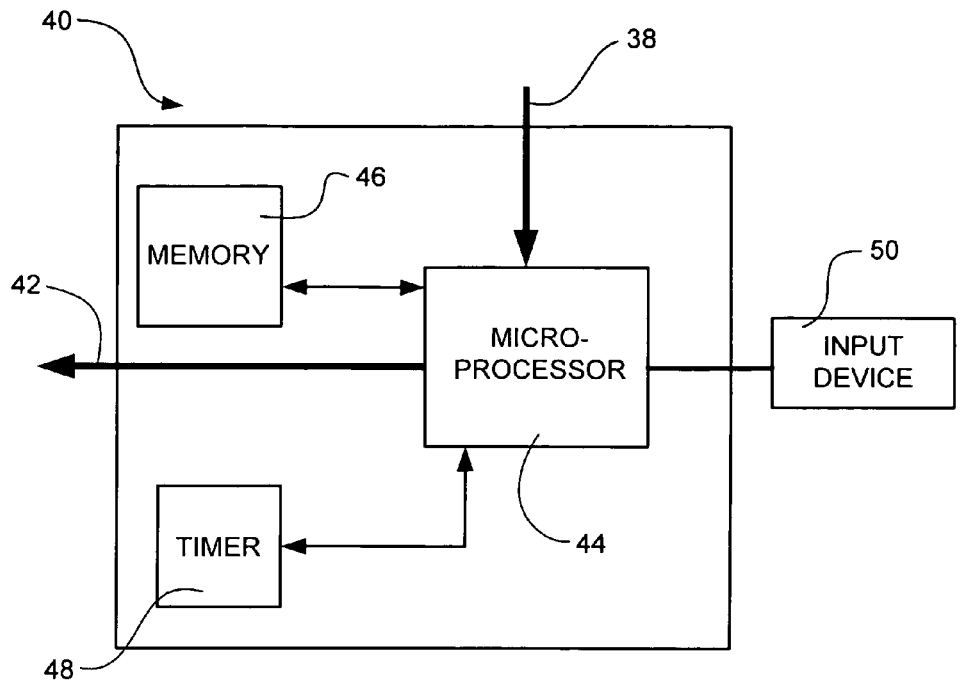
FIG. 5 is a block diagram of one embodiment of an automatic power control servo for an arc lamp system.

The power control servo 40 receives a light intensity signal from the photodetector 36, and determines what, if any, adjustment is needed in light output, and sends a corresponding signal to the power supply 18 to cause the power supply to increase or decrease power to the arc lamp 12 in order to produce the desired output. A block diagram of the functional elements of one embodiment of a power control servo is shown in FIG. 5. The power control servo can comprise control electronics and programming that are part of the arc lamp device controller (e.g. projector control electronics), or it can be a separate hardware unit (e.g. an application specific integrated circuit or ASIC) that is connected to the arc lamp device control circuitry.

In the embodiment of FIG. 5 the power control servo 40 includes a microprocessor 44, with associated memory 46 for storing programming instructions and data. The power control servo can also include a timer routine or circuit 48, and an input interface or device 50, such as a keypad or menu device, can also be associated with the power control servo to allow a user to input data to the device. For example, the input interface can allow a user to manually select or adjust the arc lamp output level for desired brightness, and can allow a user to reset the power control servo when a new lamp is installed. Additionally, given that different lamps may have different characteristics, the input interface can allow a user to input a lamp identification code or other information that identifies the characteristics of the lamp upon installation of a lamp, to allow the microprocessor to select an appropriate lamp intensity function. A group of lamp identification codes or other comparable information can be stored in memory in the power control servo.

The microprocessor 44 receives signals from the photodetector (36 in FIG. 1) via input line 38, and sends an output signal to the arc lamp power supply (18 in FIG. 1) via line 42. This feedback allows the power control servo to adjust power to the lamp to provide a pre-selected or pre-programmed output intensity. If the intensity is above or below the desired value, this will be detected by the power control servo, and an appropriate signal will be sent to the power supply to adjust the power up or down.

The arc lamp system depicted in FIG. 1 can also compare the detected light output level with a lamp intensity function for the particular lamp. For long-term lamp intensity changes, this curve will tend to be similar to the intensity curve 32 of FIG. 3. One embodiment of the logic of operation of the power control servo in this mode is depicted in the flow chart of FIG. 6A. In this process, the photodetector first detects the intensity of the lamp (step 60). The microprocessor (44 in FIG. 5) then reads the cumulative lamp use time value (step 62) that has been calculated by the timer element (block 48 in FIG. 5) and stored in memory (block 46 in FIG. 5). The microprocessor then compares the detected lamp intensity with the statistically predicted lamp intensity based upon the lamp intensity curve (step 64).

At this point, the process of adjusting the lamp power (step 66) can include several sub-parts. In one embodiment, the power control servo simply sends a signal to adjust the lamp power to attain a user-selected or pre-programmed light intensity level. Alternatively, the microprocessor can compare the measured lamp intensity in view of the current cumulative lamp use time value, with the statistically expected lamp performance at that time based on the pre-programmed lamp intensity curve, and determine a suitable light output intensity level that will maximize the lamp life while also providing sufficient light output. The microprocessor can be programmed to allow this calculated maximum life lamp output level to vary from a set output intensity level by some maximum percent, for example. This allows the system to adjust lamp intensity down by some small amount in order to obtain significant expected life extension for the lamp. The maximum allowable magnitude of deviation that the system will allow can be preprogrammed or set by a user (e.g. using the user input device 50). This allows the microprocessor to automatically adjust the lamp output, even differently from a user-selected output level, in order to maximize the life of the lamp.

It will be apparent that the above-described method for detecting and adjusting arc lamp power can apply for both short-term and long-term lamp intensity variation, the primary difference being the applicable lamp intensity function and the time factor involved. The method with respect to long-term variation is described above. However, short-term lamp intensity variations due to electrode gap widening present some slightly different aspects. When a lamp is not active and is at "room temperature" (i.e. equilibrium with a surrounding environment), it will have a certain electrode gap D. As soon as the lamp is struck, however, the electrodes and surrounding lamp structure will immediately begin to heat up. Since the lamp includes a variety of materials with different coefficients of thermal expansion, the different materials will thermally expand at different rates as the lamp temperature rises from room temperature to a substantially steady operating temperature. During this temperature change time interval, the electrode gap can widen, or contract, or both, at different times.

To compensate for this short-term time- and temperature-based lamp intensity variation, direct feedback of lamp intensity from a photodetector can be used to vary the lamp power. It will be apparent that, given the relatively short time interval required for a lamp to reach its substantially steady operating temperature, the frequency of intensity detection and adjustment of the arc lamp power according to the flow chart of FIG. 6A will have to be relatively high to be noticeably effective.

As with long-term lamp power control, however, short-term arc lamp power control can also compare a detected lamp intensity with a programmed lamp intensity curve that relates only to electrode gap changes due to thermal expansion during start-up of a lamp. This process would proceed in a manner similar to the combined method described above, except that the statistically or experimentally determined lamp intensity curve will be a different curve—one that applies to the brief heat-up interval when the lamp is first struck.

Figure 4:
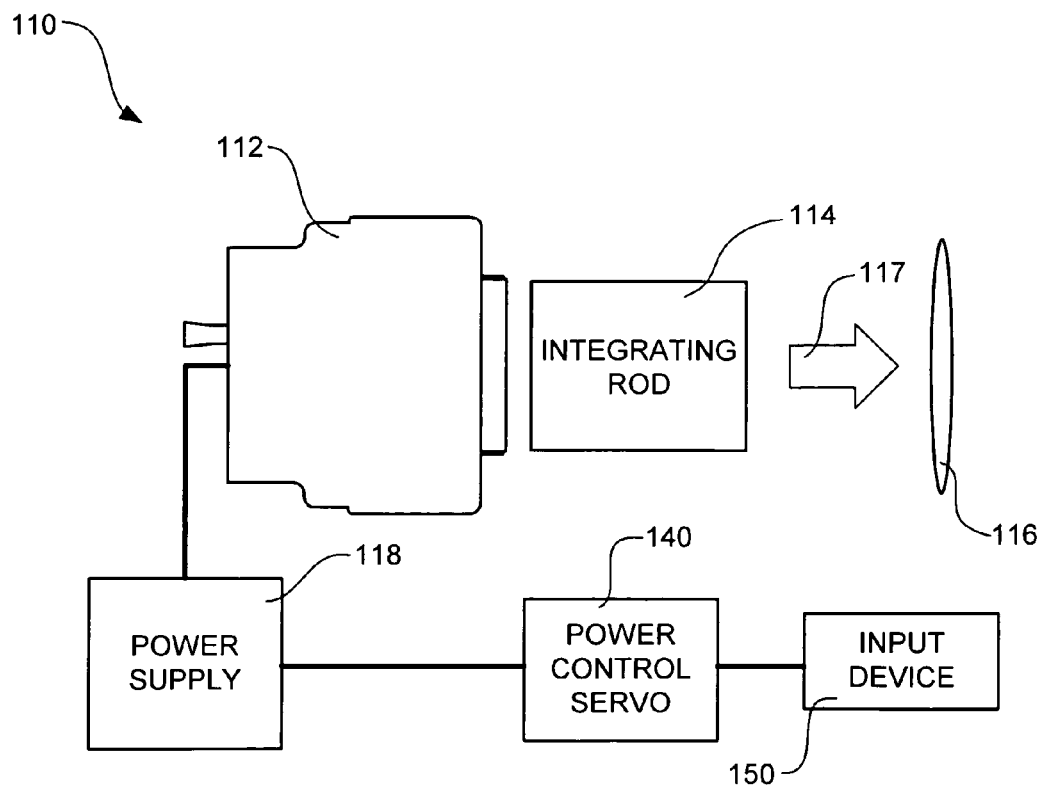
FIG. 4 is a block diagram of another embodiment of an arc lamp device having a power control servo system.

Another embodiment of a projection system including a system for automatic arc lamp power control is shown in FIG. 4. This system 110 is similar to that of FIG. 1, except that there is no photodetector. The system includes an arc lamp 112, an integrating rod 114, and projection optics 116. Connected to the lamp power supply 118 is a power control servo 140, with an associated input device. Rather than controlling the lamp power based upon direct lamp intensity feedback, this embodiment adjusts lamp power based upon a statistical control method.

The power control servo in this embodiment is similar to that shown in FIG. 5 except that there is no photodetector input line 38. In this embodiment, the microprocessor 44 is programmed to determine the appropriate lamp power level based upon a lamp intensity function for the particular arc lamp that is being used, this intensity function being stored in memory 46. The timer element 48 tracks the total cumulative time during which the arc lamp has been operated, and repeatedly updates and stores this value in the memory.

Figures 6A, 6B:
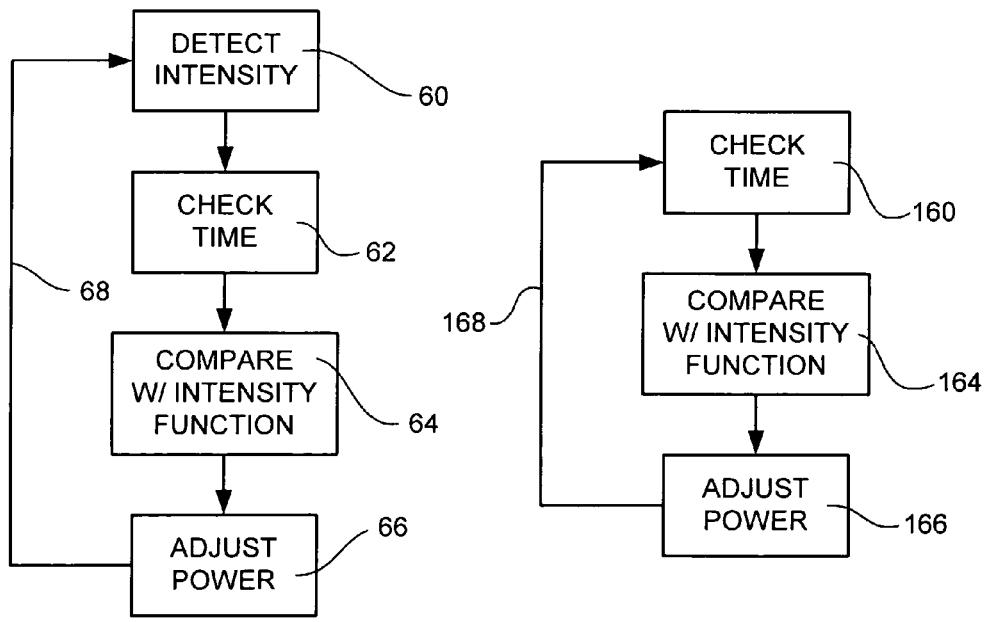
FIG. 6A is a flow chart showing the steps in one embodiment of a method for arc lamp power control.
FIG. 6B is a flow chart showing the steps in another embodiment of a method for arc lamp power control.

One embodiment of the logic of operation of the power control servo in this mode is depicted in the flow chart of FIG. 6B. In this process, the microprocessor (44 in FIG. 5) first reads the cumulative lamp use time value (step 160) that has been calculated by the timer element (block 48 in FIG. 5) and stored in memory (block 46 in FIG. 5). The microprocessor then adjusts power to the lamp (step 166) based upon the time position on the lamp intensity curve (step 164), and repeats this process (as indicated by arrow 168) continuously (e.g. at some regular time interval) whenever the lamp is operating. In this step the microprocessor compares the current cumulative lamp use time value with the statistically expected lamp performance at that time, based on the pre-programmed lamp intensity curve, and determines an appropriate lamp power level that will provide a suitable lamp intensity and maximize the lamp life. As noted above, the microprocessor can be programmed to allow this calculated maximum life lamp output level to vary from a set output intensity level by some maximum amount.

As noted above, the system and method described with respect to FIGS. 4 and 6B can compensate for both long-term and short-term electrode gap variation in an arc lamp. In particular, a time- and temperature-based lamp intensity function can be statistically (i.e. experimentally) determined for the arc lamp, and this function can be programmed in memory in the microprocessor of the power control servo. The process for adjusting lamp power upon start-up of the lamp then follows substantially as indicated in FIG. 6B, except that the time value that is read in step 160 is a time-from-start-up value (i.e. the time immediately elapsed since the lamp was struck). This relatively short time value can represent the statistically or experimentally determined time required for the lamp to reach its stable operating temperature. During this start-up time interval, the microprocessor adjusts power to the lamp (step 166) based upon the time position on the start-up lamp intensity curve (step 164), and repeats this process (as indicated by arrow 168) until the start-up time interval ends or the lamp reaches an equilibrium temperature.

The system of FIG. 1, using feedback from a photodetector, can also compensate for short-term electrode gap variation during lamp start-up using only a statistically or experimentally determined start-up lamp intensity curve stored in memory. This method is similar to that associated with the arc lamp power control system embodiment of FIG. 4, which has been described.

The system and method disclosed herein thus provides a system and method for controlling the light output of an arc lamp to provide more consistent brightness, and also to lengthen the useful life of the lamp. The system provides an automatic power control servo, which adjusts the input power to the arc lamp, based on either or both of detected lamp output and statistically expected lamp output during lamp start-up and during long-term use of the lamp. If the output power of the lamp goes down, the automatic power control servo (APCS) will drive more power (current) to lamp to increase light output, and vice-versa. While the method applies to systems incorporating ultra-high pressure Xenon lamps, it is not limited to these.

One positive aspect of the system and method disclosed herein is that it requires minimal modification of hardware in the arc lamp device. While some redesign of its physical circuits may be required, the functions and elements of the power control servo shown in FIG. 5 can be performed by the device controller (not shown) when properly programmed. For example, many arc lamp ballasts have a manual (potentiometer) or electrical (firmware) device for controlling the current that is supplied to the lamp at steady state. The automatic power control servo disclosed herein can very easily interconnect with this existing power control hardware, such that minimal if any ballast modifications will be necessary to incorporate this system. So long as necessary connections to the lamp power supply are provided, the system can easily adjust lamp output on a time basis to lengthen the life of the lamp. Additionally, the embodiment of FIG. 4 in particular requires little or no additional hardware because no photodetector is included.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. An arc lamp system comprising:
   a) an arc lamp, having a life span;
   b) a power supply, electrically coupled to the arc lamp and configured to provide power thereto; and
   c) a power control servo, coupled to the power supply, configured to cause the power supply to provide lower power to the arc lamp at a beginning of the life span, and to provide greater power to the arc lamp toward an end of the life span.

2. An arc lamp system in accordance with claim 1, wherein the power control servo is configured to generally gradually increase power to the arc lamp over the life span of the arc lamp.

3. An arc lamp system in accordance with claim 1, further comprising a photodetector, exposed to light from the arc lamp and coupled to the power control servo, configured to produce a light intensity signal representing an intensity of output from the arc lamp, the power control servo being configured to control the power supply based upon the light intensity signal.

4. An arc lamp system in accordance with claim 3, wherein the power control servo is further configured to compare the light intensity signal to a preprogrammed lamp intensity curve representing a statistically probable lamp intensity change curve for the arc lamp.

5. An arc lamp system in accordance with claim 3, further comprising a beam splitter, disposed in a light output path of the arc lamp, configured to direct a portion of light from the arc lamp to the photodetector.

6. An arc lamp system in accordance with claim 1, wherein the power control servo further comprises:
   d) a microprocessor; and
   e) memory, associated with the microprocessor, including a lamp intensity curve representing a statistically probable lamp intensity change curve for the arc lamp, the microprocessor being programmed to adjust power to the lamp according to the lamp intensity curve.

7. An arc lamp system in accordance with claim 6, further comprising a timer circuit, configured to provide a lamp use time value to the microprocessor, the microprocessor being configured to determine a position on the lamp intensity curve according to the lamp use time value.

8. An arc lamp system in accordance with claim 6, wherein the lamp use time value is selected from the group consisting of a cumulative lamp use time value for the elapsed lamp life, and a time-from-start-up value for a single lamp use session.

9. A method for powering an arc lamp having a lamp life span, comprising the steps of:
   a) reducing power to the arc lamp at a beginning of the lamp life span; and
   b) increasing power to the arc lamp toward an end of the life span of the arc lamp.

10. A method in accordance with claim 9, wherein the step of increasing power to the arc lamp toward an end of the life span of the arc lamp comprises generally gradually increasing power throughout the lamp's life span.

11. A method in accordance with claim 9, wherein the step of increasing power to the arc lamp toward an end of the life span of the arc lamp comprises increasing power based upon a preprogrammed lamp intensity curve representing a statistically probable lamp intensity change curve for the arc lamp.

12. A method in accordance with claim 11, wherein the step of increasing power to the arc lamp toward an end of the life span of the arc lamp comprises:
   c) reading a lamp use time value;
   d) adjusting power to the lamp based upon the time position on the lamp intensity curve; and
   e) repeating steps (c) and (d) whenever the lamp is operating.

13. A method in accordance with claim 12, wherein the lamp use time value represents a total cumulative lamp use over the life of the lamp.

14. A method in accordance with claim 13, wherein the step of adjusting power to the lamp based upon the time position on the lamp intensity curve comprises comparing the current cumulative lamp use time value with a statistically expected lamp performance at that time, based on the pre-programmed lamp intensity curve, to determine an appropriate lamp power level.

15. A method in accordance with claim 14, wherein the appropriate lamp power level is calculated to maximize lamp life lamp output level to vary from a set output intensity level by some maximum amount.

16. A method in accordance with claim 11, wherein the lamp use time value represents a time-from-start-up value for a current lamp use session.

17. A method in accordance with claim 9, wherein the step of increasing power to the arc lamp further comprises adjusting power based upon actual light output of the arc lamp.

18. A method in accordance with claim 17, wherein the step of adjusting power based upon detection of actual light output intensity of the arc lamp further comprises:
   c) detecting an intensity of light output from the arc lamp;
   d) adjusting power to the lamp based upon the output intensity of the lamp so as to obtain substantially constant lamp output over the lamp life span; and
   e) repeating steps (c) and (d) whenever the lamp is operating.

19. A method in accordance with claim 18, further comprising the steps of:
   f) reading a cumulative lamp use time value; and
   g) comparing the detected lamp intensity with a statistically predicted lamp intensity value based upon a preprogrammed lamp intensity curve representing a statistically probable lamp intensity change curve for the arc lamp.

20. A method for increasing a life span of an arc lamp, comprising the steps of:
   a) actuating the arc lamp;
   b) detecting an intensity of light output of the arc lamp;
   c) comparing the detected lamp light output with a lamp intensity function representing a statistically expected lamp output associated with a current age of the arc lamp;
   d) adjusting power to the arc lamp to cause the lamp to provide light output at a level closer to a statistically expected average intensity level for the life span of the arc lamp.

* * * * *